United States Patent
Baijal et al.

(10) Patent No.: US 11,450,127 B2
(45) Date of Patent: Sep. 20, 2022

(54) ELECTRONIC APPARATUS FOR PATENTABILITY ASSESSMENT AND METHOD FOR CONTROLLING THEREOF

(71) Applicant: SAMSUNG ELECTRONICS CO., LTD., Suwon-si (KR)

(72) Inventors: Anant Baijal, Suwon-si (KR); Changkun Park, Suwon-si (KR); Jeongrok Jang, Suwon-si (KR); Jaehwang Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 17/000,672

(22) Filed: Aug. 24, 2020

(65) Prior Publication Data

US 2021/0117669 A1    Apr. 22, 2021

(30) Foreign Application Priority Data

Oct. 18, 2019    (KR) .......................... 10-2019-0129629

(51) Int. Cl.
*G06V 30/414*    (2022.01)
*G06Q 50/18*    (2012.01)
*G06K 9/62*    (2022.01)
*G06N 3/08*    (2006.01)
*G06V 30/416*    (2022.01)

(52) U.S. Cl.
CPC .......... *G06V 30/414* (2022.01); *G06K 9/6256* (2013.01); *G06N 3/08* (2013.01); *G06Q 50/184* (2013.01); *G06V 30/416* (2022.01)

(58) Field of Classification Search
CPC ........... G06K 9/00463; G06K 9/00469; G06K 9/6256; G06N 3/08; G06Q 50/184; G06V 30/414; G06V 30/416; G06V 10/774
See application file for complete search history.

(56) References Cited

U.S. PATENT DOCUMENTS

| | | | |
|---|---|---|---|
| 8,472,861 B2 | 6/2013 | Andreyev et al. | |
| 8,943,033 B2 | 1/2015 | Hamilton, II et al. | |
| 9,767,190 B2 | 9/2017 | Lundberg et al. | |
| 9,922,383 B2 | 3/2018 | George | |
| 10,133,791 B1 | 11/2018 | Chan | |
| 10,346,035 B2 | 7/2019 | Xia et al. | |
| 2016/0099983 A1 | 4/2016 | Han et al. | |
| 2018/0232361 A1 | 8/2018 | Schick et al. | |
| 2018/0336439 A1* | 11/2018 | Kliger ................. | G06N 3/0472 |
| 2021/0350125 A1* | 11/2021 | Arvela ............... | G06K 9/00483 |

FOREIGN PATENT DOCUMENTS

JP    6531302    *    6/2019

OTHER PUBLICATIONS

Computer English Translation of Japanese Patent No. 6531302.. (Year: 2019), pp. 1-21.*

* cited by examiner

*Primary Examiner* — Daniel G Mariam

(74) *Attorney, Agent, or Firm* — Nixon & Vanderhye, P.C.

(57) ABSTRACT

An electronic apparatus including a display is disclosed. The electronic apparatus, based on text information including a plurality of words being input via an input unit, obtain an input claim based on the text information, determine novelty of the input claim by inputting the input claim to a first neural network model, and based on the input claim being novel, determine inventiveness of the input claim by inputting the input claim to a second neural network model.

10 Claims, 15 Drawing Sheets

ELECTRONIC APPARATUS FOR PATENTABILITY ASSESSMENT AND METHOD FOR CONTROLLING THEREOF

CROSS-REFERENCE TO RELATED APPLICATION

This application is based on and claims priority under 35 U.S.C. § 119 to Korean Patent Application No. 10-2019-0129629, filed on Oct. 18, 2019, in the Korean Intellectual Property Office, the disclosure of which is incorporated by reference herein in its entirety.

BACKGROUND

1. Field

The disclosure relates to an electronic apparatus which determines patentability of a claim and a method for controlling thereof, and for example, relates to a technology of determining patentability of a claim using a neural network model trained to determine patentability of a claim.

2. Description of Related Art

In recent years, artificial intelligence systems have been used in various fields. The artificial intelligence system may refer, for example, to a system in which a machine trains, determines, and becomes smart itself, unlike a rule-based smart system of the related art. As the artificial intelligence system is used, a recognition rate is improved and preferences of a user can be more accurately understood, and thus, the rule-based system of the related art is gradually being replaced with the deep learning-based artificial intelligence system.

The artificial intelligence technologies include machine learning (e.g., deep learning) and elementary technologies using the machine learning.

The machine learning may refer, for example, to an algorithm technology of self-classifying/self-training features of input data, and the elementary technology may refer, for example, to a technology of simulating functions of the human brain such as recognition or determination using the machine learning algorithm such as the deep learning and includes technical fields of language understanding, visual understanding, inference/prediction, knowledge representation, operation control, and the like. For example, the language understanding may refer to a technology of recognizing languages/alphabets of human and applying/processing it and includes natural language processing, machine translation, a conversion system, question and answer, voice recognition/synthesis, and the like.

Recently, research for a method for determining patentability of a claim of patent documents using the artificial intelligence has been conducted.

SUMMARY

Embodiments of the disclosure provide an electronic apparatus capable of determining a novelty and an inventiveness of a patent claim.

Embodiments of the disclosure provide an electronic apparatus which amends a claim based on the determination of patentability of the patent claim.

Embodiments of the disclosure are not limited to the above-mentioned technical objects and other technical objects which are not mentioned above may be clearly understood by those skilled in the art from the description below.

In accordance with an example embodiment of the disclosure, an electronic apparatus is provided, the electronic apparatus including: a display; an input unit comprising input circuitry; a memory storing one or more instructions; and a processor configured to execute the one or more instructions stored in the memory, wherein the processor, by executing the one or more instructions, is configured to: based on text information including a plurality of words being input via the input unit, obtain an input claim based on the text information; determine novelty of the input claim by inputting the input claim to a first neural network model trained to determine novelty of a claim; and based on the input claim being novel, determine inventiveness of the input claim by inputting the input claim to a second neural network model trained to determine inventiveness of a claim.

The processor may be configured to: obtain a first vector value corresponding to each of a plurality of words included in the input claim; obtain a first feature value corresponding to the input claim by inputting the first vector value to the first neural network model; and determine the novelty of the input claim by comparing the first feature value with a second feature value corresponding to at least one prior art document.

The processor may be configured to: based on a distance value calculated based on the first feature value and the second feature value being equal to or greater than a predetermined first threshold value, determine that the input claim is novel; and based on the distance value being less than the first threshold value, determine that the input claim is not novel.

The processor may be configured to, based on the input claim being determined to be novel, determine inventiveness of the input claim by inputting the input claim to a second neural network model trained based on a rejected claim and a prior art document suggested by an examiner as a cited reference of the rejected claim.

The processor may be configured to, based on the input claim being determined to be not novel or not inventive, obtain an amended claim by inputting the input claim to a third neural network model trained to generate a claim amended from the input claim.

The processor may be configured to: determine novelty of the amended claim by inputting the amended claim to the first neural network model; and based on the amended claim being novel, determine inventiveness of the amended claim by inputting the amended claim to the second neural network model.

The third neural network model may comprise a generative adversarial network (GAN).

The processor may be configured to: obtain an image corresponding to a touch received via the input unit; obtain a plurality of words by analyzing the image; and obtain a claim based on the plurality of obtained words.

In accordance with another example embodiment of the disclosure, a method for controlling an electronic apparatus is provided, the method comprising: based on text information including a plurality of words being input via an input unit, obtaining an input claim based on the text information; determining novelty of the input claim by inputting the input claim to a first neural network model trained to determine novelty of a claim; and based on the input claim being novel, determining inventiveness of the input claim by inputting the input claim to a second neural network model trained to determine inventiveness of a claim.

The solution presented in the disclosure is not limited to the above-mentioned solutions, and the solutions not mentioned will be apparently understood by those skilled in the art from the disclosure and accompanying drawings.

According to the various example embodiments of the disclosure, the user may receive determination of novelty and inventiveness of a patent claim through the electronic apparatus.

Therefore, it is possible to improve user convenience and satisfaction.

In addition, other effects obtainable from the embodiments of the disclosure will be disclosed directly or implicitly in the detailed description of the disclosure. For example, various effects predicted according to the embodiments of the disclosure will be described in the detailed description below.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
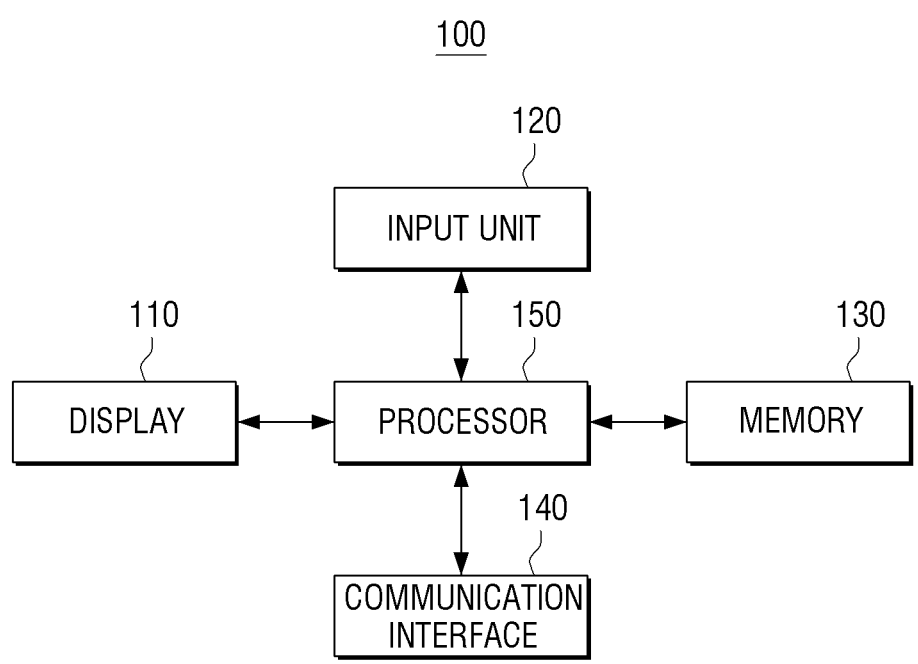
FIG. 1 is a block diagram illustrating an example configuration of an electronic apparatus according to an embodiment.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

Hereinafter, with reference to the accompanying drawings, embodiments of the disclosure will be described in greater detail. But, the disclosure may be implemented in various different forms and is not limited to the embodiments described herein. In addition, in the drawings, the parts not relating to the description are omitted for clearly describing the disclosure, and the same reference numerals are used for the same parts throughout the disclosure.

FIG. 1 is a block diagram illustrating an example configuration of an electronic apparatus according to an embodiment.

Referring to FIG. 1, an electronic apparatus 100 may include a display 110, an input unit (e.g., including input circuitry) 120, a memory 130, a communication interface (e.g., including communication circuitry) 140, and a processor (e.g., including processing circuitry) 150.

The display 110 may display various screens. For example, the display 110 may display a text corresponding to a user input. The display 110 may display a claim input by a user.

In addition, the display 110 may display at least one object which corresponds to a function of the electronic apparatus 100 and is selectable by a user. For example, the display 110 may display an object corresponding to novelty determination of a claim input by a user. The object may be displayed as an icon, an image, a text, or the like. In an example, the display 110 may display an object including a text of "novelty determination". In addition, the object may be implemented as a push button.

Further, the display 110 may display a result obtained by performing the function corresponding to the object selected by the user. For example, when the user selects the object corresponding to the "novelty determination", the display 110 may display a novelty determination result of the input claim. In addition, when the claim input by the user are determined to be not novel, the display 110 may display an amended claim generated based on the input claim.

The display 110 may be provided as a touch screen. There is no limitation thereto and various methods for implementing the display 110 may be used.

The input unit 120 may include various input circuitry and receive a user input and transmit the user input to the processor 150.

The input unit 120 may be implemented in various forms in accordance with the user input. For example, the input unit 120 may be implemented as a touch screen provided on the display 110 to receive a touch input of the user. This is merely an embodiment, and the input unit 120 may be implemented as a keyboard, a mouse, and the like for recognizing a key input of the user.

The memory 130 may store an operating system (OS) for controlling general operations of elements of the electronic apparatus 100 and instructions or data related to the elements of the electronic apparatus 100. For this, the memory 130 may be implemented as a non-volatile memory (e.g., a hard disk drive, a solid state drive (SSD), or a flash memory), and a volatile memory.

For example, the memory 130 may store an instruction for causing the processor 150 to perform novelty determination of the input claim, when a user input for selecting the novelty determination is obtained, at the time of execution.

In addition, the memory 130 may store data regarding a plurality of prior patents used for determining patentability. For example, the memory 130 may store data regarding laid-open patents provided for each country over the world. The memory 130 may classify and store lists of the published patents for each country and for each technical field.

The communication interface 140 may include various communication circuitry and communicate with various types of external devices in accordance with various types of communication systems. The communication interface 140 may include a Wi-Fi chip and a Bluetooth chip. The communication interface 140 may perform data communication with an external device or an external server in a wireless or wired manner.

The processor 150 may include various processing circuitry and communicate with an external server or an external device via the communication interface 140. For example, the processor 150 may obtain a laid-open patent list from the external server via the communication interface 140.

The processor 150 may include various processing circuitry and control general operations of the electronic apparatus 100. For example, the processor 150 may control a content to be displayed by the display 110. In addition, the processor 150 may store data regarding the prior patents received from the external server via the communication interface 140 in the memory 130. The processor 150 may display a patent related to the input claim obtained from a user via the input unit 120 among the prior patents stored in the memory 130 via the display 110.

The processor 150 may obtain text information including a plurality of words from the user via the input unit 120 and obtain the input claim based on the text information. In addition, the processor 150 may generate the input claim based on the obtained text information. Specifically, when the user inputs at least one keyword, the processor 150 may generate the input claim based on the input keyword.

In addition, the processor 150 may determine patentability of the input claim based on a user command. For example, when a novelty determination command of the user is obtained, the processor 150 may perform a novelty determination operation of the input claim.

For example, the processor 150 may input the input claim to a first neural network model trained to output a feature value of the input claim and obtain a first feature value corresponding to the input claim. The processor 150 may determine the novelty of the input claim based on the first feature value of the input claim and a second feature value corresponding to one prior art. For example, the processor 150 may determine that the input claim is novel, when a distance value calculated based on the first feature value and the second feature value is equal to or greater than a predetermined threshold value, and determine that the input claim is not novel, when the distance value is equal to or less than the predetermined threshold value. The feature value may refer to a vector value obtained by digitizing the text. For example, the feature value may be obtained by word-to-vector conversion. This will be described in greater detail below with reference to FIGS. 4A, 4B and 4C.

When the input claim is determined to be novel, the processor may determine inventiveness of the input claim. For example, the processor 150 may input the input claim to a second neural network model trained based on rejected claims and prior arts suggested by an examiner the Intellectual Property Office as references of the rejected claims to determine the inventiveness of the input claim. For convenience of description, the first neural network model and the second neural network model are distinguished in the description, but the first neural network model and the second neural network model may be implemented as a single neural network model.

When the input claim is determined to be not novel, the processor 150 may generate an amended claim based on the input claim. For example, the processor 150 may generate the amended claim by inputting the input claim to a third neural network model trained to generate a claim having improved novelty than the input claim from the input claim.

In addition, when the input claim is determined to be not inventive, the processor 150 may generate the amended claim based on the input claim. For example, the processor 150 may generate the amended claim by inputting the input claim to a fourth neural network model trained to generate a claim having improved inventiveness than the input claim from the input claim. For convenience of description, the third neural network model and the fourth neural network model are distinguished in the description, but the third neural network model and the fourth neural network model may be implemented as a single neural network model.

The processor 150 may determine the novelty of the amended claim by inputting the amended claim to the first neural network model. In addition, the processor 150 may determine the inventiveness of the amended claim by inputting the amended claim to the second neural network model.

For example, functions related to artificial intelligence according to the disclosure may be operated through the processor 150 and the memory 130. The processor 150 may include one or a plurality of processors. The one or the plurality of processors may include, for example, a general-purpose processor such as a CPU, an AP, or a digital signal processor (DSP), a graphic dedicated processor such as a GPU or a vision processing unit (VPU), or an artificial intelligence dedicated processor such as an NPU, or the like. The one or the plurality of processors may perform control to process the input data according to a predefined action rule stored in the memory 130 or an artificial intelligence model. In addition, if the one or the plurality of processors are artificial intelligence dedicated processors, the artificial intelligence dedicated processor may be designed to have a hardware structure specialized in processing of a specific artificial intelligence model.

The predefined action rule or the artificial intelligence model may be formed through training. The forming through training herein may refer, for example, to forming a predefined action rule or an artificial intelligence model set to perform a desired feature (or object) by training a basic artificial intelligence model using a plurality of pieces of learning data by a learning algorithm. Such training may be performed in a device demonstrating artificial intelligence according to the disclosure or performed by a separate server and/or system. Examples of the learning algorithm include supervised learning, unsupervised learning, semi-supervised learning, or reinforcement learning, but is not limited to these examples.

The artificial intelligence model may include a plurality of neural network layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process. The artificial neural network may include deep neural network (DNN), and, for example, and without limitation, include a convolutional neural network (CNN), deep neural network (DNN), recurrent neural network (RNN), restricted Boltzmann machine (RBM), deep belief network (DBN), bidirectional recurrent deep neural network (BRDNN), generative adversarial network (GAN), deep Q-network, or the like, but there is no limitation to these examples.

Figure 2:
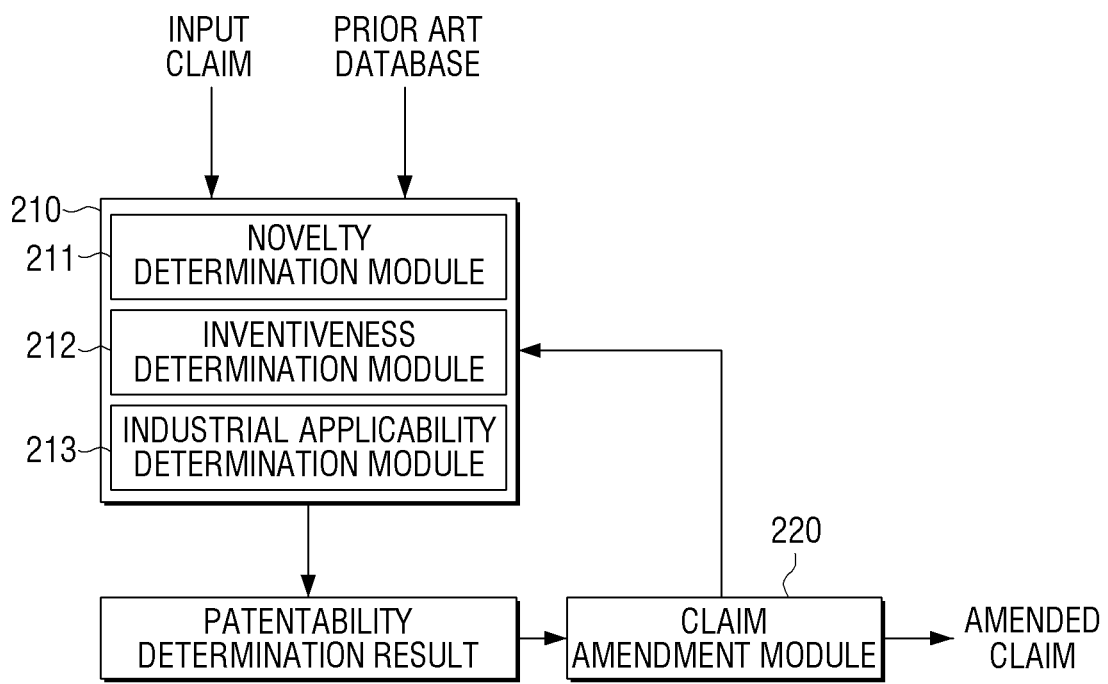
FIG. 2 is a diagram illustrating an example patentability determining method and a claim amending method according to an embodiment.

FIG. 2 is a diagram illustrating an example patentability determining method and a claim amending method according to an embodiment A patentability determination module 210 may include a novelty determination module (e.g., including processing circuitry and/or executable program elements) 211, an inventiveness determination module (e.g., including processing circuitry and/or executable program elements) 212, and an industrial applicability determination module (e.g., including processing circuitry and/or executable program elements) 213. In addition, the determination module 210 may include modules determining other patent requirements.

The patentability determination module 210 may output a patentability determination result of the input claim by receiving the input claim and a prior art database. The patentability determination result may be a probability value of 0 to 1. In addition, the patentability determination result may include a probability value corresponding to each of various patent requirements as will be described below. However, this is merely an embodiment and the patentability determination result may be a true/false value according to the patentability.

The prior art database described hereinabove and hereinafter may include various prior arts. The "prior" art may refer to the art which is laid open before an effective filing date of the input claim. In addition, the prior art may include various types of documents such as academic literatures, in addition to the specifications including claims and the detailed description of the laid-open patent.

The processor 150 may determine various patent requirements of the input claim using the patentability determination module 210. For example, the patent requirements may include novelty, inventiveness, and industrial applicability. In addition, the processor 150 may determine whether the input claim satisfies typical drafting requirements in the Patent Act.

The patentability determination module 210 may include various neural network models. For example, the patentability determination module 210 may include a first neural network model for determining novelty and a second neural network model for determining inventiveness. In addition, the patentability determination module 210 may include a neural network model for determining industrial applicability. The neural network models described above may be implemented as separate models or may be implemented as one integrated model. The neural network model for determining the patentability described above may output a determination result of each patentability based on semantic language.

The patentability determination module 210 may be implemented as software, but this is merely an embodiment, and the patentability determination module 210 may be implemented in a combined form of software and hardware. The patentability determination module 210 and the claim amendment module (e.g., including processing circuitry and/or executable program elements) 220 may be stored in the memory 130.

The processor 150 may display the patentability determination result via the display 110. Therefore, it is possible to improve user convenience since the user may receive the patentability determination result of the input claim.

The processor 150 may determine whether to execute the claim amendment module 220 based on the patentability determination result output from the patentability determination module 210.

For example, when the patentability determination result is greater than a predetermined reference value, the processor 150 may not use the claim amendment module 220.

When the patentability determination result is less than the predetermined reference value, the processor 150 may obtain an amended claim by inputting the input claim to the claim amendment module 220. For example, when the novelty determination result of the input claim output from the patentability determination module 210 is less than the predetermined reference value, the processor 150 may obtain the amended claim by inputting the input claim to the claim amendment module 220. Accordingly, the processor 150 may obtain a claim having improved novelty than the initially input claim.

The claim amendment module 220 may receive one input claim and output at least one or more amended claims. In other words, the number of output amended claims may be more than one.

The processor 150 may display the obtained amended claim via the display 110. Therefore, it is possible to improve user convenience.

The claim amendment module 220 may include the third neural network model trained to generate a claim having improved patentability than the input claim based on the input claim and the prior art database.

The processor 150 may determine the patentability of the amended claim by inputting the amended claim obtained via the claim amendment module 220 to the patentability determination module 210.

Figure 3:
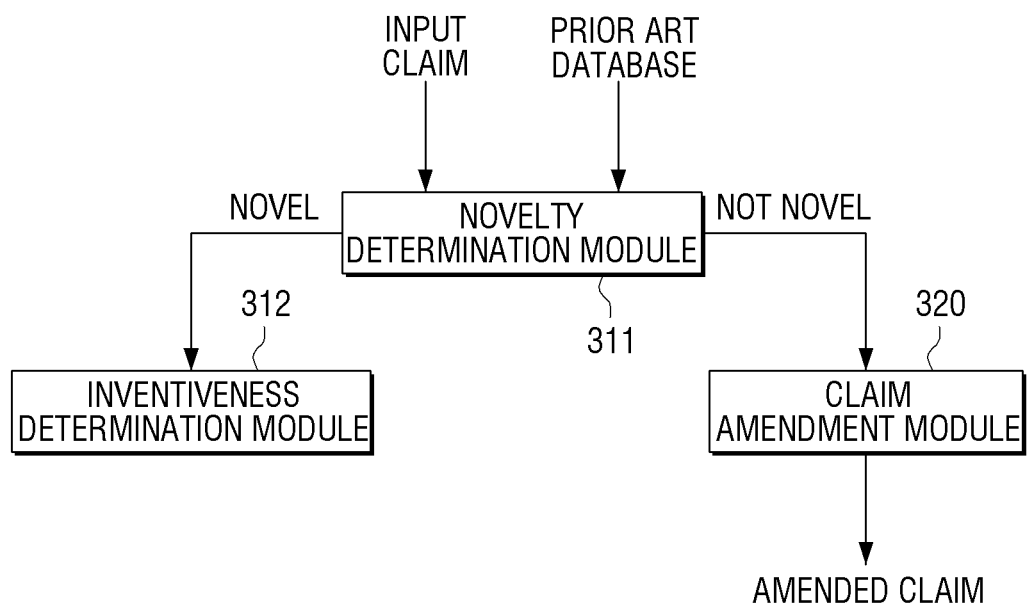
FIG. 3 is a diagram illustrating an example patentability determining method and a claim amending method according to an embodiment.

FIG. 3 is a diagram illustrating an example patentability determining method and a claim amending method according to an embodiment.

A novelty determination module (e.g., including processing circuitry and/or executable program elements) 311, an inventiveness determination module (e.g., including processing circuitry and/or executable program elements) 312, and a claim amendment module (e.g., including processing circuitry and/or executable program elements) 320 of FIG. 3 may be operated in the same or similar method as the novelty determination module 211, the inventiveness determination module 212, and the claim amendment module 220 of FIG. 2, respectively. Therefore, the description of parts overlapped with those in FIG. 2 may not be repeated for convenience of description.

The processor 150 may determine the novelty of the input claim by inputting the input claim and the prior art database to the novelty determination module 311.

The novelty determination module 311 may identify prior arts related to the input claim from the prior art database. The novelty determination module 311 may output the novelty determination result of the input claim by comparing the identified prior arts with the input claim.

When the input claim is determined to be novel as a result of the novelty determination of the input claim, the processor 150 may determine the inventiveness of the input claim by inputting the input claim to the inventiveness determination module 312. At this time, the inventiveness determination module 312 may identify the prior art related to the input claim from the prior art database and output an inventiveness determination result of the input claim by comparing the identified prior art with the input claim.

When the input claim is determined to be not novel as a result of the novelty determination of the input claim, the processor 150 may obtain the amended claim by inputting the input claim to the claim amendment module 320. The claim amendment module 320 may output the amended claim based on the prior art and the prior used when determining the novelty of the input claim and the prior art database.

Hereinafter, the operation of each module will be described in greater detail.

Figure 4A:
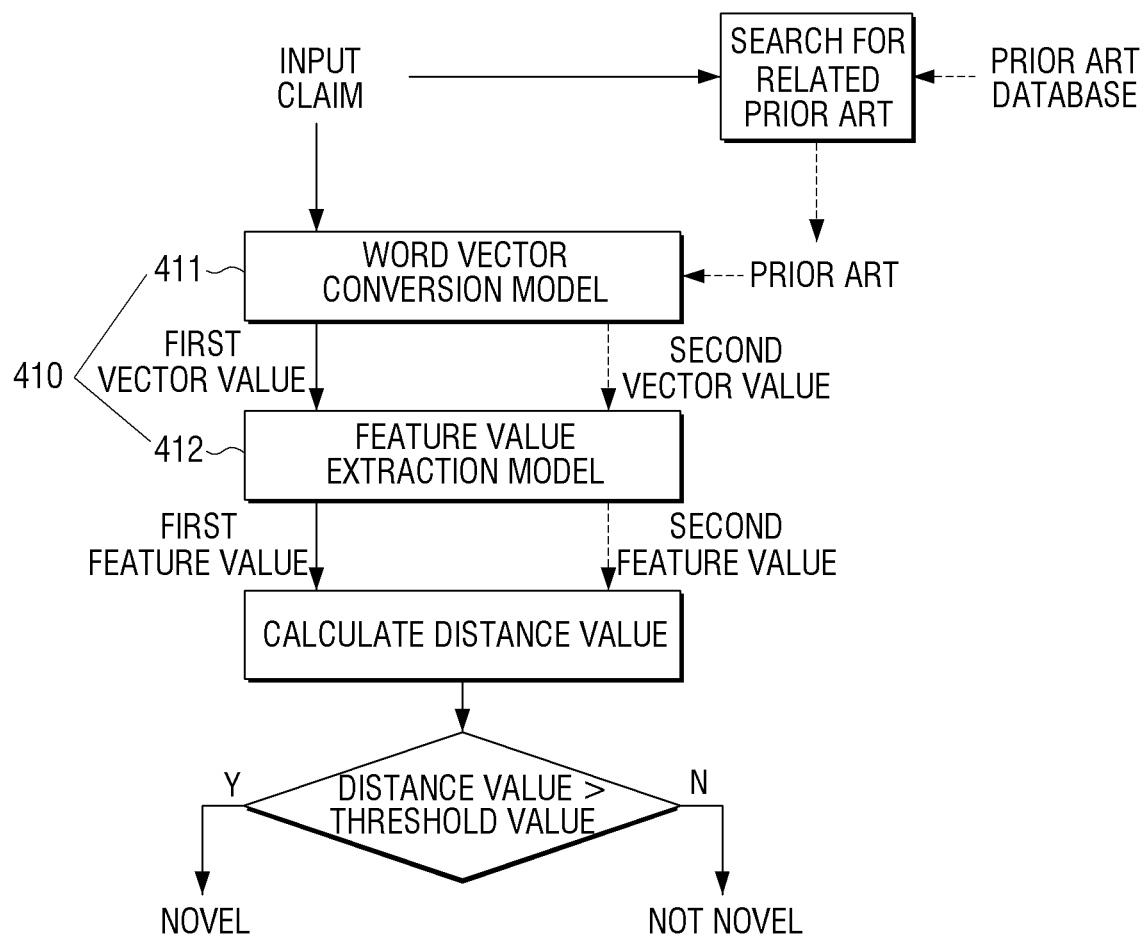
FIG. 4A is a diagram illustrating an example novelty determining method according to an embodiment.

FIG. 4A is a diagram illustrating an example novelty determining method according to an embodiment.

The novelty determination module 410 may include a word vector conversion model (e.g., including processing circuitry and/or executable program elements) 411 and a feature value extraction model (e.g., including processing circuitry and/or executable program elements) 412. The word vector conversion model 411 and the feature value extraction model 412 may include neural networks, respectively.

The word vector conversion model 411 may receive the input claim and output a first vector value. In addition, the word vector conversion model 411 may receive the prior art and output a second vector value. In other words, the word vector conversion model 411 may perform a word-to-vector conversion operation.

The prior art input to the word vector conversion model 411 may be the prior art searched based on the input claim and the prior art database. In addition, the prior art is a prior art related to the input claim and, for example, may be obtained by considering the technical field of the input claim.

Figure 4B:
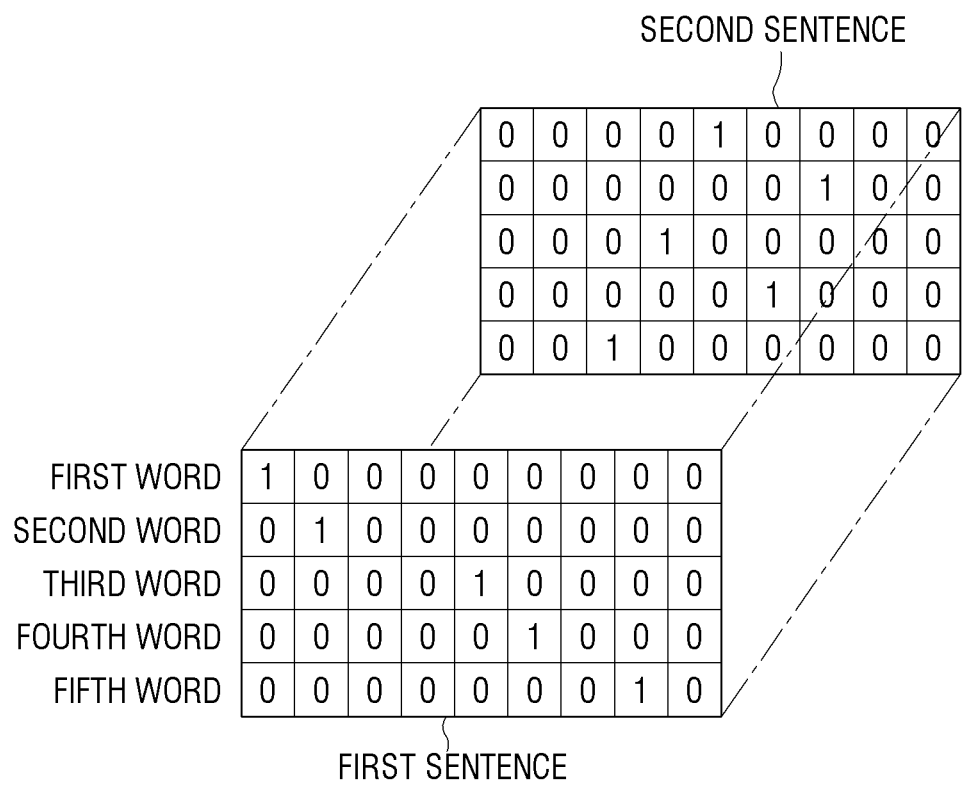
FIG. 4B is a diagram illustrating an example vector value according to an embodiment.

The processor 150 may obtain the first vector value and the second vector value and input the first vector value and the second vector value to the feature value extraction model 412. The feature value extraction model 412 may output a first feature value and a second feature value respectively from the first vector value and the second vector value. The first feature value and the second feature value herein may be the same vector values as illustrated in FIG. 4B. For example, the first vector value illustrated in FIG. 4B may include numerical values corresponding to words and sentences included in the input claim. More specifically, the vector value may correspond to each of the plurality of words included in the sentence. The feature value extraction model 412 may extract the feature value based on the semantic language.

Figure 4C:
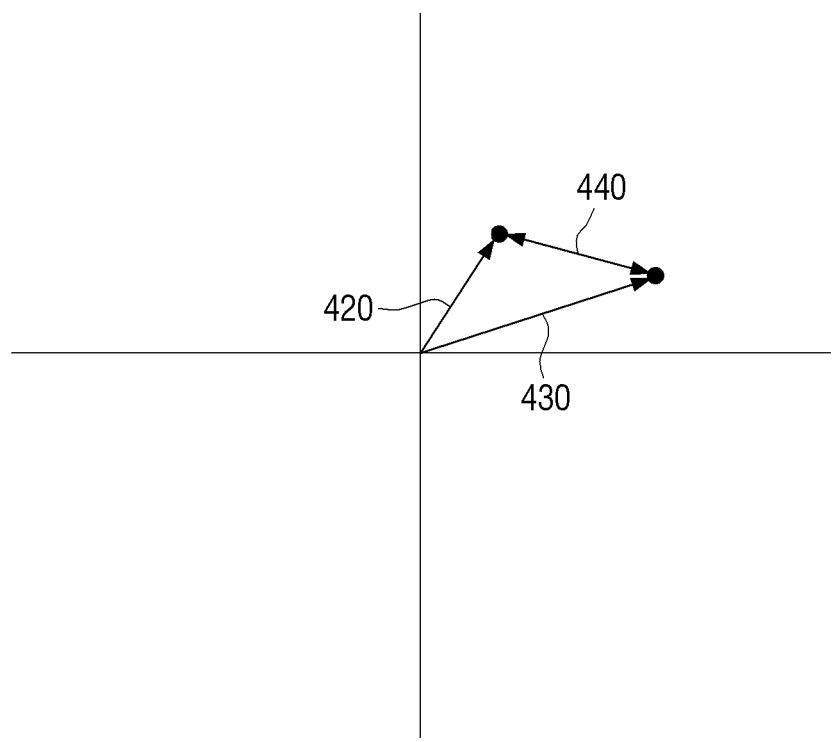
FIG. 4C is a diagram illustrating an example feature value and a distance value according to an embodiment.

The processor 150 may obtain the first feature value and the second feature value and determine the novelty of the input claim based on the first feature value and the second feature value. In an example, as illustrated in FIG. 4C, the processor 150 may calculate a distance value 440 based on the first feature value 420 and the second feature value 430 and determine the novelty of the input claim by comparing the distance value 440 with a predetermined threshold value.

When the calculated distance value is greater than the predetermined threshold value, the processor 150 may determine that the input claim is novel. In addition, when the calculated distance value is less than the predetermined threshold value, the processor 150 may determine that the input claim is not novel.

If the novelty determination module 410 is provided with the neural network, the novelty determination module 410 may be trained by various methods. In an example, the novelty determination module 410 may be trained to set an optimal threshold value based on the first feature value and the second feature value.

Figure 5A:
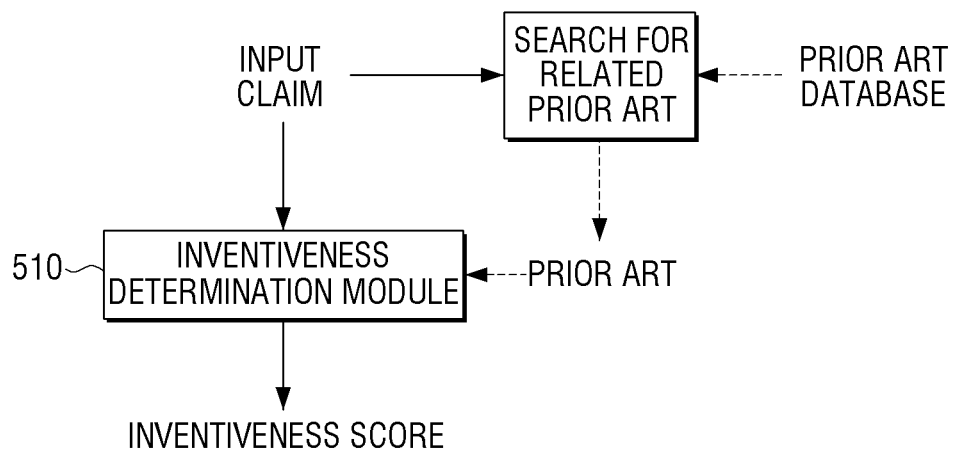
FIG. 5A is a diagram illustrating an example inventiveness determining method according to an embodiment.

FIG. 5A is a diagram illustrating an example inventiveness determining method according to an embodiment. An inventiveness determination module (e.g., including processing circuitry and/or executable program elements) 510 may be operated in the same or similar manner as the inventiveness determination module 312 of FIG. 3. Therefore, the description of parts overlapped with those in FIG. 3 may not be repeated.

The processor 150 may obtain an inventiveness score of the input claim by inputting the input claim and the prior art to the inventiveness determination module 510. The processor 150 may determine the inventiveness of the input claim by comparing the obtained inventiveness score with a predetermined threshold score. The inventiveness score herein may be a probability value.

The prior art input to the inventiveness determination module 510 may be searched for and selected from the prior art database based on the input claim. At this time, the prior art may be selected from the prior art database based on a keyword included in the input claim.

Figure 5B:
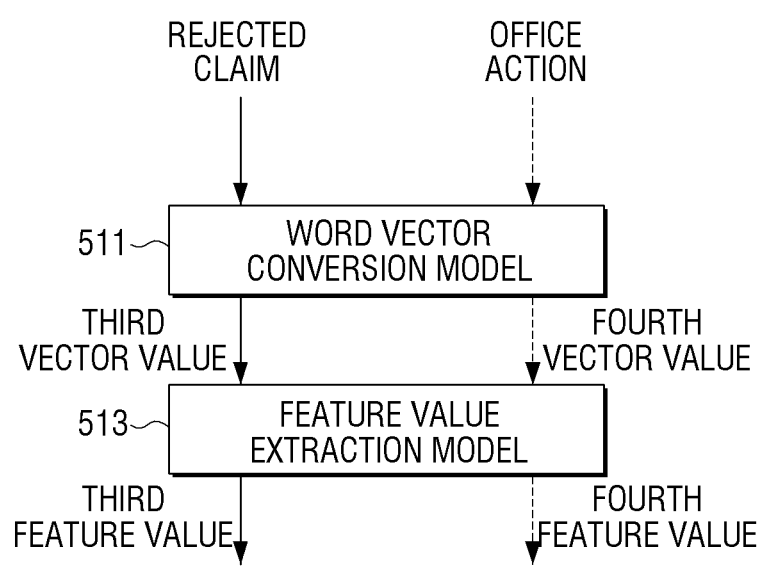
FIG. 5B is a diagram illustrating an example training method according to an embodiment of an inventiveness determination module of FIG. 5A.

FIG. 5B is a diagram illustrating an example training method according to an embodiment of the inventiveness determination module 510 of FIG. 5A.

The inventiveness determination module 510 may include a word vector conversion model (e.g., including processing circuitry and/or executable program elements) 511 and a feature value extraction model (e.g., including processing circuitry and/or executable program elements) 513. The word vector conversion model 511 may receive a rejected claim and output a third vector value. The feature value extraction model 513 may receive the third vector and output a third feature value. In addition, the word vector conversion model 511 may receive an office action and output a fourth vector value. At this time, the feature value extraction model 513 may receive the fourth vector value and output a fourth feature value.

The rejected claim and the office action may be provided from the patent database managed by each country or company. For example, the rejected claim and the office action may be provided from the United States Patent and Trademark Office (USPTO), the World Intellectual Property Organization (WIPO), and Korean Intellectual Property Office (KIPO). In addition to the above data, the patent data base managed by each country or company may include data of all sorts of documents regarding application such as patent applications, all sorts of documents regarding examination such as notices regarding examination (office actions, communications, and the like), amendments and arguments of the applicants, and cited references, and all sorts of documents regarding registration such as notices of allowance and official gazette.

In addition, the word vector conversion model 511 and the feature value extraction model 513 may be implemented as neural network models, respectively. In addition, for convenience of description, the word vector conversion model 511 and the feature value extraction model 513 have been distinguished in the description, but the word vector conversion model 511 and the feature value extraction model 513 may be implemented as one integrated model.

The rejected claim may refer to a claim rejected based on violation of inventiveness. The rejected claim herein may include not only the rejected claim, but also amended claims amended through the amendment performed from the filing of the application until the decision of rejection. The office action may include information regarding cited references which may be grounds for rejection of the rejected claim, information regarding elements of the cited references corresponding to elements of the rejected claim, opinion of an examiner regarding the examination of the inventiveness. Further, the office action may correspond to the rejected claim.

The inventiveness determination module 510 may be trained based on the rejected claim and the office action. In other words, the inventiveness determination module 510 may be trained whether the input claim is novel based on the rejected claim and the office action. For example, the inventiveness determination module 510 may be trained based on comparison between the third feature value and the fourth feature value. For example, a distance value may be obtained based on the comparison between the third feature value and the fourth feature value. In addition, the inventiveness determination module 510 may repeatedly receive a plurality of pairs of rejected claims and office actions and output the plurality of third feature values and fourth feature values. Accordingly, a plurality of distance values may be obtained. An average value of the plurality of distance values may be obtained based on the plurality of distance values. The inventiveness determination module 510 may obtain based on the average value of the distance values.

In addition, the inventiveness determination module 510 may be trained based on a plurality of pairs of rejected claims and office actions, not only one pair of the rejected claim and the office action. For example, the inventiveness determination module 510 may be trained based on a first rejected claim rejected due to violation of inventiveness and a first office action corresponding to the first rejected claim, and a second rejected claim rejected again due to violation of inventiveness after being amended from the first rejected claim and a second office action corresponding to the second rejected claim. In other words, the inventiveness determination module 510 may be trained based on the whole examination history occurred during the examination process of the rejected claim.

Since the rejected claim and the office action are provided as a pair from the patent database, a labelling operation may not be necessary. Therefore, it is possible to easily train the inventiveness determination module 510.

When the input claim is input, the trained inventiveness determination module 510 may output data indicating a degree of violation of inventiveness of the input claim. For example, the inventiveness determination module 510 may output an inventiveness violation probability value of the input claim. The processor 150 may determine the inventiveness of the input claim based on the data output from the inventiveness determination module 510.

Figure 5C:
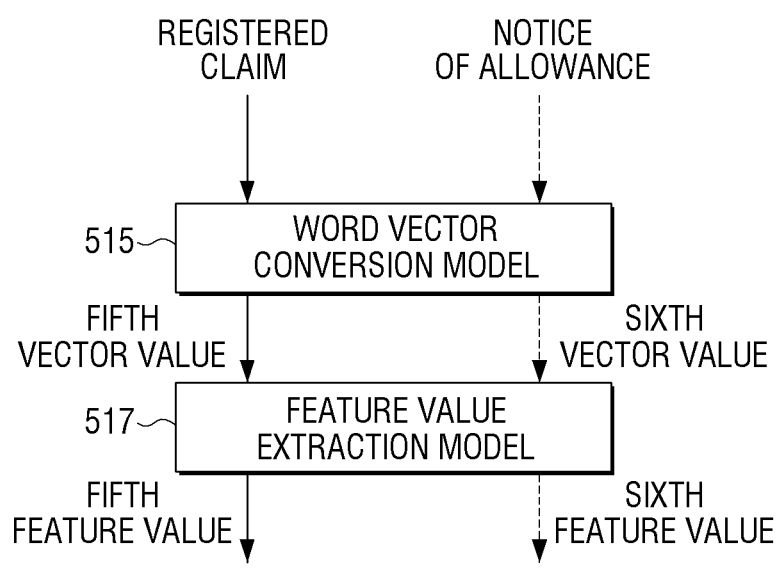
FIG. 5C is a diagram illustrating an example training method according to another embodiment of the inventiveness determination module of FIG. 5A.

FIG. 5C is a diagram illustrating an example training method according to another embodiment of the inventiveness determination module 510 of FIG. 5A. The description of parts overlapped with those in FIG. 5B may not be repeated and differences will be mainly described.

The inventiveness determination module 510 may include a word vector conversion model (e.g., including processing circuitry and/or executable program elements) 515 and a feature value extraction model (e.g., including processing circuitry and/or executable program elements) 517. The word vector conversion model 515 may receive the rejected claim and output a fifth vector value. At this time, the feature value extraction model 517 may receive the fifth vector and output a fifth feature value. In addition, the word vector conversion model 515 may receive an office action and output a sixth vector value. At this time, the feature value extraction model 517 may receive the sixth vector value and output a sixth feature value.

A registered claim and a notice of allowance may be provided from the patent database managed by each country or company. The registered claim may include claims registered immediately without rejection and claims rejected due to violation of inventiveness but then registered through amendment. The notice of allowance may correspond to the registered claim and include information regarding opinion of the examiner regarding the registered claim and prior art related to the registered claim.

The inventiveness determination module 510 may be trained based on the registered claim and the notice of allowance. For example, the inventiveness determination module 510 may be trained based on a comparison between the fifth feature value and the sixth feature value. In addition, the inventiveness determination module 510 may be trained based on a feature value of each of an initially filed claim, a claim rejected due to violation of inventiveness, and a registered claim. For example, the inventiveness determination module 510 may obtain a distance value based on the fifth feature value and the sixth feature value. The inventiveness determination module 510 may be trained based on a comparison between the obtained distance value and a predetermined distance value. For example, the inventiveness determination module 510 may be trained to recognize inventiveness, when the obtained distance value is greater than the predetermined distance value.

When the input claim is input, the trained inventiveness determination module 510 may output the data indicating a degree of inventiveness of the input claim. For example, the inventiveness determination module 510 may output a probability value of the inventiveness of the input claim. The processor 150 may determine the inventiveness of the input claim based on the data output from the inventiveness determination module 510.

Figure 6A:
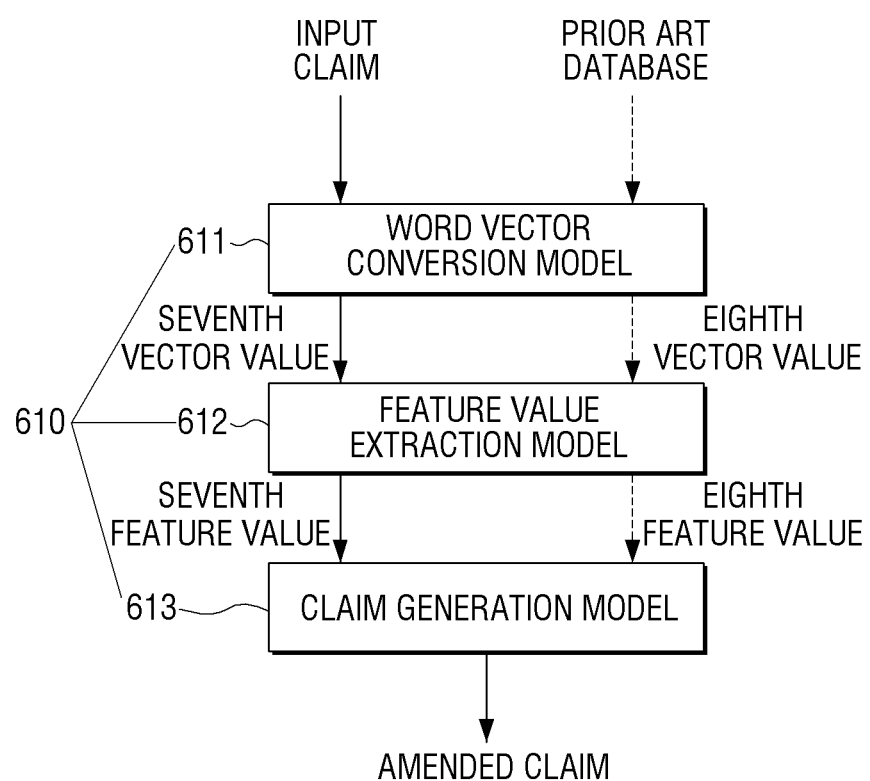
FIG. 6A is a diagram illustrating example operations of a claim amendment module according to an embodiment.

FIG. 6A is a diagram illustrating example operations of a claim amendment module according to an embodiment.

A claim amendment module 610 may include a word vector conversion model (e.g., including processing circuitry and/or executable program elements) 611, a feature value extraction model (e.g., including processing circuitry and/or executable program elements) 612, and a claim generation model (e.g., including processing circuitry and/or executable program elements) 613.

The word vector conversion model 611 may receive the input claim and output a seventh vector value. In addition, the word vector conversion model 611 may receive a prior art database and output an eighth vector value. In addition, the word vector conversion model 611 may receive at least one prior art related to the input claim from the prior arts included in the prior art database and output the eighth vector value.

The feature value extraction model 612 may receive the seventh vector value and the eighth vector value and output a seventh feature value and an eighth feature value, respectively. The claim generation model 613 may generate an amended claim based on the seventh feature value and the eighth feature value.

Each of the word vector conversion model 611, the feature value extraction model 612, and the claim generation model 613 may be implemented as a neural network model. In addition, for convenience of description, the word vector conversion model 611, the feature value extraction model 612, and the claim generation model 613 are distinguished in the description, but the word vector conversion model 611, the feature value extraction model 612, and the claim generation model 613 may be implemented as a single model.

Figure 6B:
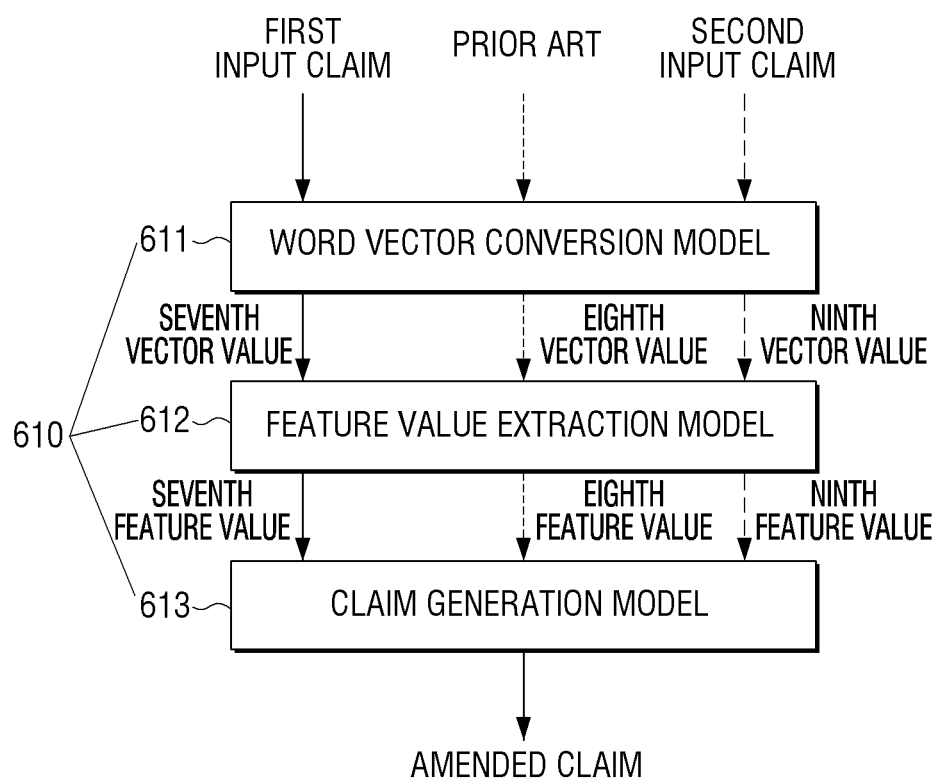
FIG. 6B is a diagram illustrating an example training method of the claim amendment module of FIG. 6A.

FIG. 6B is a diagram illustrating an example training method of the claim amendment module of FIG. 6A.

A first input claim may refer to a rejected claim. In addition, the prior art may refer to a cited reference of the first input claim. A second input claim may refer to a claim registered after amending based on the first input claim.

The word vector conversion model 611 may receive the second input claim and output a ninth vector value. In addition, the feature value extraction model 612 may receive the ninth vector value and output a ninth feature value.

The claim amendment module 610 may be trained based on the first input claim, the prior art, and the second input claim. In other words, the claim amendment module 610 may be trained based on the rejected claim, the cited reference, and a claim registered by overcoming a rejection reason. For example, the claim amendment module 610 may be trained to generate a claim which has overcome the rejection reason based on the seventh feature value, the eighth feature value, and the ninth feature value.

Figure 7A:
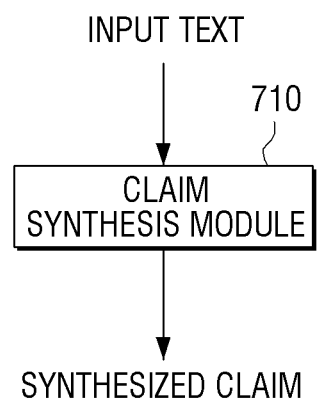
FIG. 7A is a diagram illustrating an example claim synthesis module according to an embodiment.

FIG. 7A is a diagram illustrating an example claim synthesis module according to an embodiment.

Referring to FIG. 7A, a claim synthesis module (e.g., including processing circuitry and/or executable program elements) 710 may receive a text and output a synthesized claim.

For example, the claim synthesis module 710 may extract a keyword from a text input. The claim synthesis module 710 may synthesize or generate a claim based on the extracted keyword.

Figure 7B:
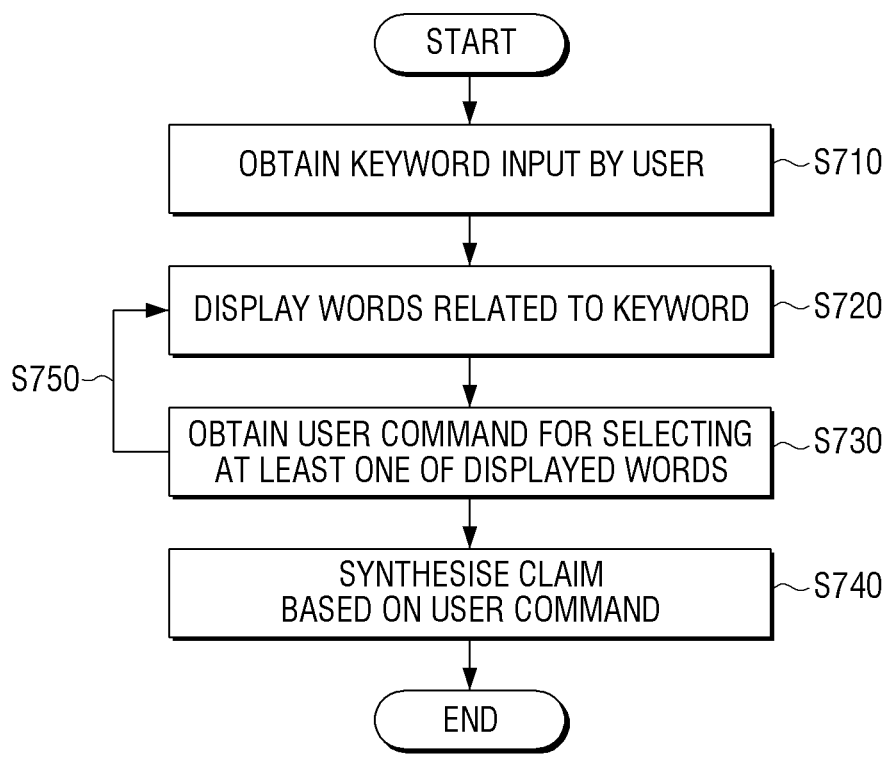
FIG. 7B is a flowchart illustrating an example claim synthesis operation according to an embodiment.

FIG. 7B is a flowchart illustrating an example claim synthesis operation according to an embodiment.

The processor 150 may obtain a keyword from a text input by a user (S710). In addition, the processor 150 may display words related to the obtained keyword (S720). Further, the processor 150 may obtain a user command for selecting at least one of the displayed words (S730). The processor 150 may synthesize the claim based on a user command (S740).

Hereinafter, each step will be described in greater detail.

The processor 150 may obtain a keyword from a text input by a user (S710). For example, the processor 150 may recognize a text obtained from the user based on the semantic language and obtain a keyword included in the text. The processor 150 may obtain at least one word related to the obtained keyword.

The processor 150 may display the at least one word related to the obtained keyword via the display 110 (S720). Accordingly, the user may check the text input by the user and the related words.

The processor 150 may obtain a user command for selecting at least one of the displayed words (S730). At this time, the processor 150 may obtain the user command for selecting the at least one of the displayed words via the input unit 120.

The processor 150 may synthesize a claim based on the user command (S740). For example, the processor 150 may obtain a claim by inputting the word corresponding to the user selection to the claim synthesis module 710. In other words, the claim synthesis module 710 may generate a claim based on the word corresponding to the user selection. At this time, the claim synthesis module 710 may include a generative adversarial network (GAN).

The claim synthesis module 710 may synthesize a new claim based on a claim generated in advance and the word corresponding to the user selection. At this time, the claim synthesis module 710 may include a conditional generative adversarial network (CGAN) or a deep-text-generative model.

When a user command for selecting at least one of the displayed words is obtained, the processor 150 may display other words related to the word corresponding to the user selection again (S750). In other words, Step S720 and Step S730 may be repeatedly carried out. Accordingly, the electronic apparatus 100 may perform an interaction with the user.

Figure 8:
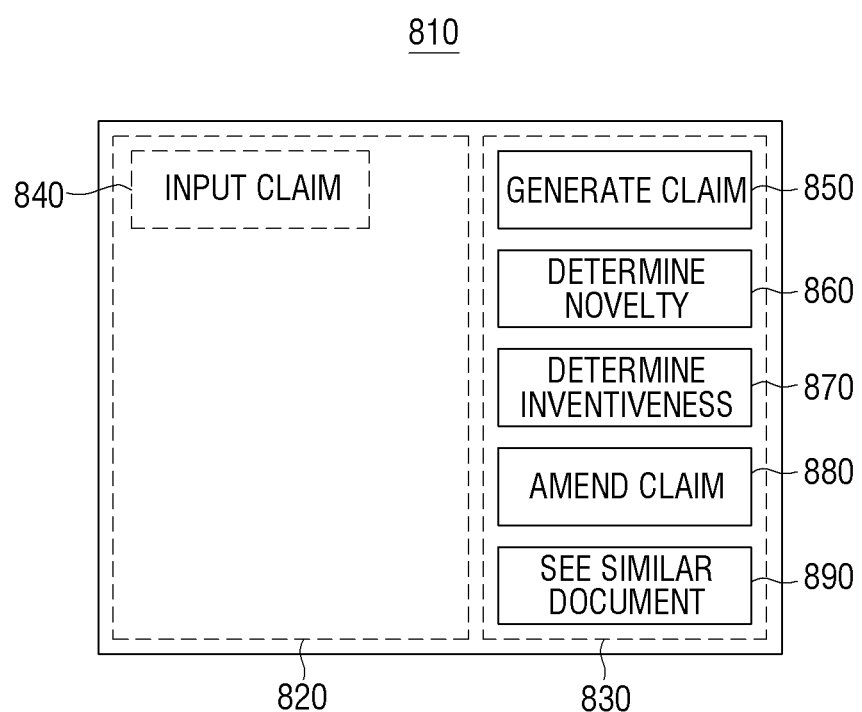
FIG. 8 is a diagram illustrating an example display of an electronic apparatus according to an embodiment.

FIG. 8 is a diagram illustrating an example display of an electronic apparatus according to an embodiment.

Referring to FIG. 8, a display 810 may include a first region 820 where a text or an input claim 840 corresponding to a user input is displayed, and a second region 830 where objects related to the functions of the electronic apparatus are displayed. For convenience of description, FIG. 8 illustrates the first region 820 and the second region 830 to be distinguished, but this is merely an embodiment, and the first region 820 and the second region 830 may be overlapped. For example, the second region 830 may be included in the first region 820.

The display 810 may display various objects related to the functions of the electronic apparatus. For example, the display 810 may display an object 850 for generating a claim, an object 860 for determining novelty, an object 870 for determining inventiveness, an object 880 for amending a claim, and an object 890 for viewing a similar document. FIG. 8 illustrates each of the objects to be displayed as the text, but this is merely an embodiment, and each of the objects may be displayed as an image or an icon.

For example, when the object 850 for generating a claim is selected after a user text is input, the processor 150 may synthesize or generate a claim based on the text input by the user using the claim synthesis module 710. The processor 150 may control the display 810 to display the synthesized or generated claim.

When a user command for selecting the object 860 for determining novelty is obtained, the processor 150 may determine novelty of the input claim 840 using the novelty determination module 211. The processor 150 may control the display 810 to display a novelty determination result of the input claim 840.

When a user command for selecting the object 870 for determining inventiveness is obtained, the processor 150 may determine inventiveness of the input claim 840 using the inventiveness determination module 212. The processor 150 may control the display 810 to display an inventiveness determination result of the input claim 840.

When a user command for selecting the object 880 for amending a claim is obtained, the processor 150 may obtain an amended claim based on the input claim 840 using the claim amendment module 220. The processor 150 may control the display 810 to display the obtained amended claim.

When a user command for selecting the object 890 for a similar document, the processor 150 may control the display 810 to display information regarding a similar document related to the input claim 840.

If the display 810 is a touch screen, a touch sensor element may be provided on a region corresponding to the first region 820 and the second region 830. Accordingly, the user may input a text to the first region 820 and touch the object displayed on the second region 830 to execute the function corresponding to each object.

The processor 150 may control the display 810 to display the objects described above while obtaining the user input. However, this is merely an embodiment, and the processor 150 may control the display 810 to display objects after obtaining the user input. In addition, when a trigger word for invoking the object is obtained, the processor 150 may control the display 810 to display the object.

Figure 9:
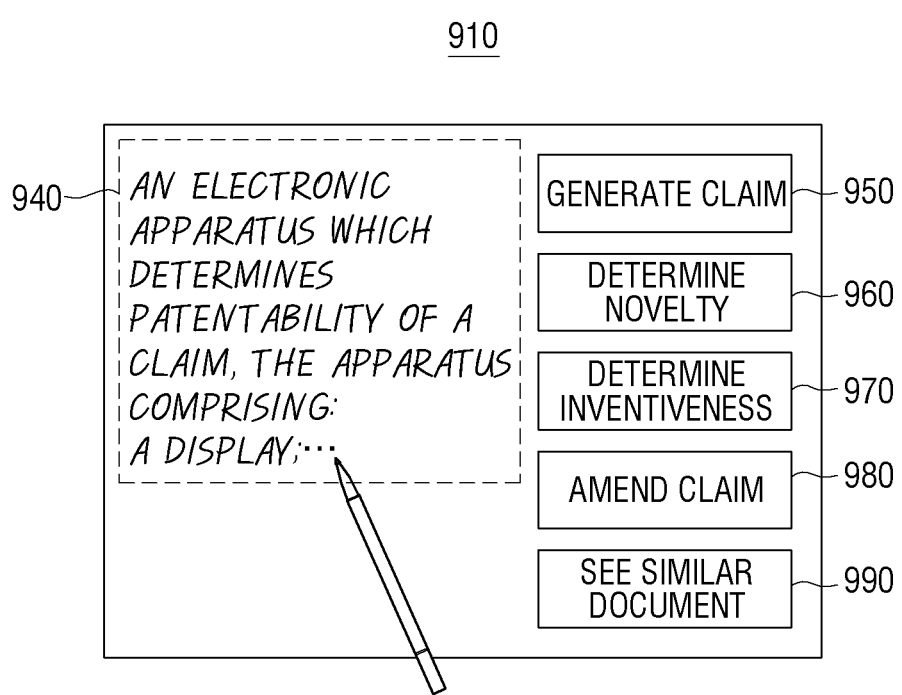
FIG. 9 is a diagram illustrating an example display of the electronic apparatus according to an embodiment.

FIG. 9 is a diagram illustrating an example display of the electronic apparatus according to an embodiment.

The description of parts overlapped with those in FIG. 8 may not be repeated. For example, an object 950 for generating a claim, an object 960 for determining novelty, an object 970 for determining inventiveness, an object 980 for amending a claim, and an object 990 for viewing a similar document may be understood based on the description with reference to FIG. 8, respectively.

The user may touch a display 910 to input an input text 940. For example, the user may input the input text 940 using a touch pen. The input text 940 may be an input claim in a claim format, but this is merely an embodiment, and the input text 940 may be any text. The processor 150 may obtain a touch input of the user to recognize the input text 940.

The embodiments described above may be implemented in a non-transitory computer readable recording medium readable by a computer or a similar apparatus using software, hardware, or a combination thereof. In some cases, the embodiments described in this disclosure may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium includes a medium that semi-permanently stores data and is readable by a machine. Examples of the non-transitory computer-readable medium may include a CD, a DVD, a hard disk drive, a Blu-ray disc, a USB, a memory card, and a ROM.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic apparatus comprising:
 a display;
 an input unit comprising input circuitry;
 a memory storing one or more instructions; and
 a processor configured to execute the one or more instructions stored in the memory,
 wherein the processor, by executing the one or more instructions, is configured to:
  based on text information including a plurality of words being input via the input unit, obtain an input claim based on the text information;
  determine industrial applicability of the obtained input claim;
  based on a determination that the obtained input claim is industrially applicable, obtain a first vector value corresponding to each of a plurality of words included in the input claim;
  obtain a first feature value corresponding to the input claim by inputting the first vector value to a first neural network model;
  determine novelty of the input claim by comparing the first feature value with a second feature value corresponding to at least one prior art document;
  based on a determination that the input claim is novel, obtain an inventiveness score of the input claim by inputting the input claim to a second neural network model trained to determine inventiveness of a claim based on a rejected claim and a prior art document as a cited reference of the rejected claim; and
  determine inventiveness of the input claim by comparing the obtained inventiveness score with a threshold score,
 wherein the processor is further configured to:
  based on the input claim not being determined to be novel or inventive, obtain an amended claim by inputting the input claim to a third neural network model trained to generate a claim amended from the input claim.

2. The apparatus according to claim 1, wherein the processor is configured to:
 based on a distance value based on the first feature value and the second feature value being equal to or greater than a first threshold value, determine that the input claim is novel; and
 based on the distance value being less than the first threshold value, determine that the input claim is not novel.

3. The apparatus according to claim 1, wherein the processor is configured to:

determine novelty of the amended claim by inputting the amended claim to the first neural network model; and based on the amended claim being novel, determine inventiveness of the amended claim by inputting the amended claim to the second neural network model.

4. The apparatus according to claim 1, wherein the third neural network model comprises a generative adversarial network (GAN).

5. The apparatus according to claim 1, wherein the processor is configured to:
obtain an image corresponding to a touch input via the input unit;
obtain a plurality of words by analyzing the image; and
obtain a claim based on the plurality of obtained words.

6. A method for controlling an electronic apparatus, the method comprising:
based on text information including a plurality of words being input via an input unit, obtaining an input claim based on the text information;
determining an industrial applicability of the obtained input claim;
based on a determination that the obtained input claim is industrially applicable, obtaining a first vector value corresponding to each of a plurality of words included in the input claim;
obtaining a first feature value corresponding to the input claim by inputting the first vector value to a first neural network model;
determining novelty of the input claim by comparing the first feature value with a second feature value corresponding to at least one prior art document;
based on a determination that the input claim is novel, obtaining an inventiveness score of the input claim by inputting the input claim to a second neural network model trained to determine inventiveness of a claim based on a rejected claim and a prior art document as a cited reference of the rejected claim; and
determining inventiveness of the input claim by comparing the obtained inventiveness score with a threshold score,
wherein the method further comprises:
based on the input claim not being determined to be novel or inventive, obtaining an amended claim by inputting the input claim to a third neural network model trained to generate a claim amended from the input claim.

7. The method according to claim 6, wherein the determining the novelty comprises:
based on a distance value based on the first feature value and the second feature value being equal to or greater than a first threshold value, determining that the input claim is novel; and
based on the distance value being less than the first threshold value, determining that the input claim is not novel.

8. The method according to claim 6, further comprising:
determining novelty of the amended claim by inputting the amended claim to the first neural network model; and
based on the amended claim being novel, determining inventiveness of the amended claim by inputting the amended claim to the second neural network model.

9. The method according to claim 6, wherein the obtaining the input claim comprises:
obtaining an image corresponding to a touch input via the input unit;
obtaining a plurality of words by analyzing the image; and
obtaining a claim based on the plurality of obtained words.

10. A non-transitory computer-readable recording medium having recorded thereon a program which, when executed by a processor of an electronic apparatus, configures the processor to control the electronic apparatus to perform operations comprising:
based on text information including a plurality of words being input via an input unit, obtaining an input claim based on the text information;
determining industrial applicability of the obtained input claim;
based on a determination that the obtained input claim is industrially applicable, obtaining a first vector value corresponding to each of a plurality of words included in the input claim;
obtaining a first feature value corresponding to the input claim by inputting the first vector value to a first neural network model;
determining novelty of the input claim by comparing the first feature value with a second feature value corresponding to at least one prior art document;
based on a determination that the input claim is novel, obtaining an inventiveness score of the input claim by inputting the input claim to a second neural network model trained to determine inventiveness of a claim based on a rejected claim and a prior art document as a cited reference of the rejected claim; and
determining inventiveness of the input claim by comparing the obtained inventiveness score with a threshold score,
wherein the operations further comprise:
based on the input claim not being determined to be novel or inventive, obtaining an amended claim by inputting the input claim to a third neural network model trained to generate a claim amended from the input claim.

* * * * *